(12) United States Patent
Haffmans

(10) Patent No.: US 6,224,119 B1
(45) Date of Patent: May 1, 2001

(54) APPARATUS FOR LIMITING DAMAGES DURING VEHICLE COLLISION

(76) Inventor: Alexander F. M. Haffmans, Weezenhof 6109, 6536 AJ Nijmegen (NL)

( * ) Notice: Subject to any disclaimer, the term of this patent is extended or adjusted under 35 U.S.C. 154(b) by 0 days.

(21) Appl. No.: 09/380,233

(22) PCT Filed: Mar. 2, 1998

(86) PCT No.: PCT/NL98/00119

§ 371 Date: Nov. 1, 1999

§ 102(e) Date: Nov. 1, 1999

(87) PCT Pub. No.: WO98/38054

PCT Pub. Date: Sep. 3, 1998

(30) Foreign Application Priority Data

Feb. 28, 1997 (NL) .................................................. 1005408

(51) Int. Cl.⁷ ............................................................. B60R 19/20
(52) U.S. Cl. ........................................... 293/107; 280/507
(58) Field of Search ................................ 293/117, 107, 293/134, 132; 280/505, 506, 507

(56) References Cited

U.S. PATENT DOCUMENTS

| | | | | |
|---|---|---|---|---|
| 4,852,902 | * | 8/1989 | Young et al. | 280/507 |
| 5,106,137 | * | 4/1992 | Curtis | 293/107 |
| 5,533,743 | * | 7/1996 | Bello | 280/507 |
| 5,560,631 | * | 10/1996 | Salvo | 280/507 |
| 5,725,265 | * | 3/1998 | Baber | 293/107 |
| 6,039,349 | * | 3/2000 | Laporte et al. | 280/748 |
| 6,056,336 | * | 5/2000 | Balgobin | 293/107 |

FOREIGN PATENT DOCUMENTS

| | | | | |
|---|---|---|---|---|
| 3240264 | * | 5/1984 | (DE) | 280/507 |
| 3600506 | * | 7/1987 | (DE) | 280/507 |
| 1251651 | * | 10/1971 | (GB) . | |
| 1399352 | * | 7/1975 | (GB) . | |
| 2169863 | * | 7/1986 | (GB) | 280/507 |

* cited by examiner

Primary Examiner—D. Glenn Dayoan
Assistant Examiner—Mickki D. Murray
(74) Attorney, Agent, or Firm—Hoffman & Baron, LLP

(57) ABSTRACT

An apparatus for limiting injuries and collision damage, intended for mounting on at least one hook located adjacent a rear side of a vehicle, the apparatus being provided with at least one hook-catching element and with an inflatable element pressing the at least one hook-catching element against the at least one hook, the apparatus comprising a functional provision connected to the at least one hook-catching element. The functional provision preferably comprises a bumper, optionally in combination with a detachable bicycle carrier or detachable housing for the storage of objects. An important advantage of the invention is that the crushable zone of the vehicle, rendered inoperative through the presence of the towing hook construction, is operative again after the apparatus according to the invention has been mounted, due to the fact that forces occurring during collisions are transmitted to the rear side of the vehicle again and not, of to a much lesser extent, to the towing hook construction.

9 Claims, 3 Drawing Sheets

APPARATUS FOR LIMITING DAMAGES DURING VEHICLE COLLISION

BACKGROUND OF THE INVENTION

The invention relates to an apparatus for limiting injuries and damages occurring in the event of a collision, intended for mounting on at least one towing hook or towing hook construction located adjacent a rear side of a vehicle.

In the fleet of cars in the Netherlands, about half of the passenger cars are provided with a towing hook. The towing hook is used only sporadically in the sense that a caravan, boat trailer or trailer is towed therewith, or that a bicycle carrier is mounted thereon. However, the towing hook or towing hook construction always remains mounted on the vehicle, also when it is not used.

The drawback of the unused towing hook or towing hook construction is that it may cause very serious injuries and may easily cause major damage in the event of a collision, even at low speeds. In collisions where the towing hook or towing hook construction contacts another object, such as a vehicle or, even worse, a person, the object hit usually sustains substantial damage caused by a point load. Moreover, the towing hook and towing hook construction itself is relatively undeformable, so that the object hit usually has to fully absorb the blow. Irreparable damage to the bodywork, broken radiators and/or fans, or personal injuries are the result. After a collision, a vehicle whose radiator or fan is damaged is usually no longer capable of moving on. The vehicle hit must then be towed away, which often necessitates a temporary road block. Hence, the direct damage and the consequential damage caused by non-used towing hook constructions are enormous.

Another drawback of the unused towing hook is that is often obstructs one's view of the number plate.

Known apparatuses according to the pre-characterizing portion of claim 1, which at least solve a part of the above-outlined problems, are for instance described in GB-A-1 399 252, DE-A-3 240 264 and U.S. Pat. No. 5,533,743.

Also known from practice are bicycle carriers that can be mounted on a towing hook of a vehicle.

Research has shown that in the event of a collision, the crushable zones located at the rear of a vehicle are largely rendered inoperative when a towing hook or towing hook construction is mounted on the rear of the vehicle. Indeed, in a collision, the towing hook or towing hook construction is hit first, the forces occurring during the collision being transmitted via the towing hook construction to points of the chassis located more adjacent the front side of the vehicle. All crushable zones located behind these points are rendered inoperative in a collision. The above research has shown that a substantial part of the victims of head-tail collisions in vehicles provided with a towing hook construction remain suffering from a permanent whiplash with bumper parts known from the above-cited patent publications, which parts are mounted on the towing hook, this problem is not solved, because in the known apparatuses the major part of the forces released during a collision are still taken by the towing hook or towing hook construction itself.

In the apparatuses known from U.S. Pat. No. 5,533,743 and GB-A-1 399 352, a part of the forces occurring during a collision are perhaps not transmitted via the towing hook construction to the points located further to the front, but, as is desired, to the rear of the car. However, these known apparatuses are not universally applicable. As it is, for each towing hook the distance from the hook to the rear of the vehicle is different. Moreover, the shape of the rear side of each vehicle is different.

SUMMARY OF THE INVENTION

It is the object of the invention to provide a new apparatus of the type mentioned in the pre-characterizing portion of claim 1 without the above-outlined drawbacks.

To this end, according to the invention, the apparatus of the type mentioned in the preamble is characterized in that it is provided with at least one hook-catching element which, in a mounted condition of the apparatus, is located between the at least one hook and the rear side of the vehicle, and with an inflatable element which, in a mounted condition of the apparatus, is located between the at least one hook-catching element and the rear side of the vehicle and is inflated, causing the at least one hook-catching element to be pressed against the at least one hook and causing the inflatable element to adapt itself, on the side thereof facing the vehicle, to the shape of the rear side of the vehicle, the apparatus comprising a functional provision connected to the at least one hook-catching element.

Such apparatus is easy to mount. Before mounting, the inflatable element should be in a non-inflated condition. The or each hook-catching element can then be fitted between the hook and the vehicle, behind the hook. Next, the inflatable element is inflated. On one side, the inflatable element pressed the or each hook-catching element firmly against the associated hook and on the other side, the shape of the inflatable element adapts itself to the shape of the rear side of the vehicle. After inflation, the functional provision which is fixedly connected to the or each hook-catching element is in a fixed position. In the event of a tail collision, the forces occurring are transmitted via the inflatable element to the rear side of the vehicle. Hence, all crushable zones of the vehicle remain available or absorbing the forces occurring during the collision. Moreover, the inflatable element itself further has a high shock-absorbing capability.

When the apparatus according to the invention is mounted on the rear side of the vehicle, the hook is protected. Since the hook, typically designed as towing hook, is protected, it cannot come into direct contact with other objects. Hence, damage to the vehicles of other road users is reduced to a minimum and in particular damages to radiators and fans of other vehicles will hardly occur anymore, if at all. Another advantage of the apparatus according to the invention is that personal injuries, which can be sustained by bumping against the towing hook, will no longer occur, because the apparatus provides the rear side of the car with an even profile again without rearwardly projecting parts. A further highly important advantage is that the chances of whiplash to the passengers of the vehicle with the hook are considerably reduced in that the crushable zones remain substantially operative during collisions. Hence, this means an enormous saving on the compensations to be paid by the insurance companies every year for this type of damage.

According to a further elaboration of the invention, the functional provision can be designed as bumper, a detachable bicycle carrier, a detachable housing for storing objects therein, or combinations thereof.

It is understood that in the functional provision, on the side of the at least one hook facing away from the vehicle, a certain free space must be present that is filled with air or readily deformable, possibly shock-absorbing material. This free space is necessary for enabling the compression of the inflatable element without the hook thereby being considerably loaded by parts of the functional provision bumping thereagaanst.

Further elaborations of the invention are described in the subclaims and will hereinafter be specified on the basis of two exemplary embodiments, with reference to the accompanying drawings.

DETAILED DESCRIPTION OF THE INVENTION

Figure 1:
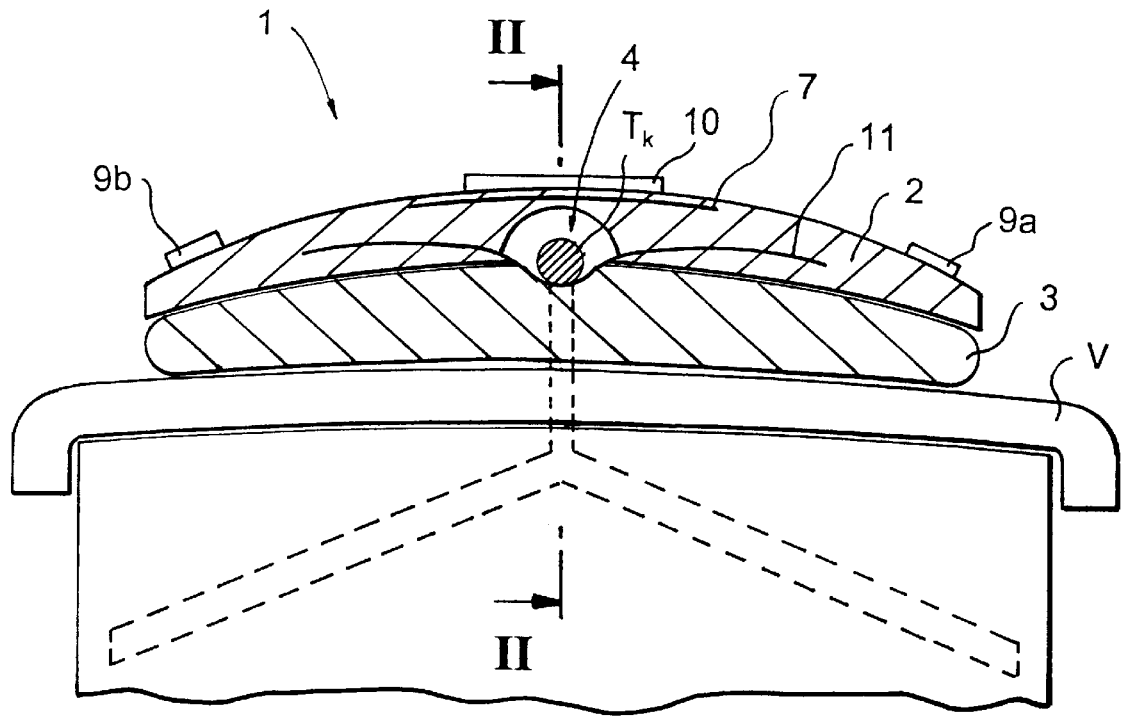
FIG. 1 is a sectional view of a first exemplary embodiment, taken on line I—I of FIG. 2.
Figure 2:
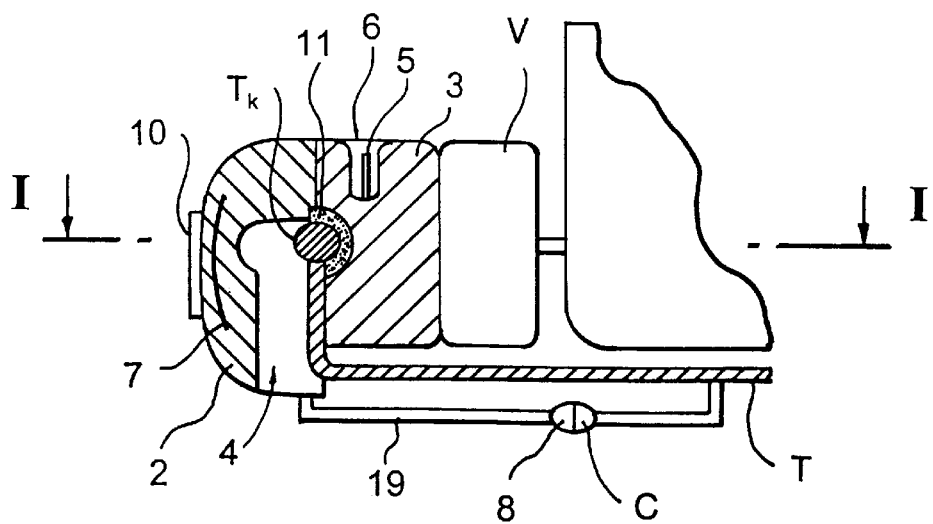
FIG. 2 is a sectional view taken on line II—II of FIG. 1.

The sectional view shown in FIG. 1 is a section along a substantially horizontal plane. The sectional view shown in FIG. 2 is a section through a vertical plane dividing the apparatus into two symmetrical halves. FIGS. 1 and 2 both show a portion of a rear side V of a vehicle provided with a towing hook construction T. Mounted on the rear side V is a first exemplary embodiment 1 of the apparatus according to the invention. The apparatus 1 comprises a functional provision designed as bumper part 2, an inflatable element 3 and a hook-catching element II. In the mounted condition, the apparatus 1 shields the towing hook T in such a manner that injuries and damages caused by the towing hook T during collisions are prevented or at least minimized. The hook-catching element 11 is fixedly connected to the bumper part 2. In the mounted condition, the inflatable element 3 is inflated and tightly retained between the hook-catching element 11 and the rear side V of the vehicle. A major advantage of an apparatus thus designed is that it is applicable to vehicles having differently designed rear sides V. Indeed, the shape of the inflatable element 3 automatically adapts itself to the shape of the bumper or the rear side V of the vehicle. This renders the exemplary embodiment shown universally applicable. On the side of the towing hook T facing away from the rear side V, a free space 4 is provided, filled with air or with shock-absorbing material. During a collision, this free space 4 prevents forces from being directly exerted on the towing hook construction T, so that at least initially, the inflatable element 3 can transmit the collision forces to the rear side V of the vehicle.

The inflatable element 3 comprises a valve 5, by means of which the inflatable element 3 can be inflated and deflated. Preferably, the valve 5 is closable with a lock. In the present exemplary embodiment, the lock is designed as a lock plate 6. In FIG. 2, the lock plate 6 is represented in its open position in a dotted line and in its closed position in a full line. The lock plate 6 can for instance be closed with a key or an electromagnetic lock. The inflatable element 3 may or may not be provided with an excess-pressure protection.

Provided in the bumper part 2 on the side of the free space 4 remote from the vehicle is a rigid plate-material part 7 for distributing the point load caused by the towing hook ball Tk during a collision when the inflatable element 3 is depressed so far that the towing hook T has passed the free space 4 completely.

Optionally, as in the present exemplary embodiment, the apparatus may comprise an electric connector 9 and a complete set of vehicle rear lighting 9a, 9b, the connector 8 being connectable to a standard connector C which, in general, is arranged on the towing hook construction T. By means of an electric connecting cable 19, the connector 8 is connected to the bumper part 2 and in particular to the vehicle rear lighting 9a, 9b located therein. The present exemplary embodiment also comprises a license plate mounting position 10, on which the license plate of the vehicle can be mounted so as to be clearly visible. This also solves the problem of the view of the vehicle's license plate being obstructed by the unused towing hook ball.

When the apparatus 1 is to be mounted, the inflatable element 3 should be in a non-inflated condition. This enables the apparatus 1 to be slid against the towing hook ball Tk, while the inflatable element 3 is moved between the rear side V of the vehicle and the towing hook ball Tk. Then, the inflatable element 3 is inflated, as a result of which the hook-catching element 11 is pressed against the towing hook ball Tk and the side of the inflatable element 3 facing the vehicle is pressed against the rear side V of the vehicle. In this manner, a form-closed connection is established between the vehicle and the associated towing hook T on one side and the apparatus 1 on the other, to obtain a stable attachment. Demounting the apparatus 1 is particularly simple, but is only possible through deflation of the inflatable element 3.

It is observed that when the towing hook is used for towing a trailer, caravan or boat trailer, or for carrying a bicycle carrier, the apparatus can be mounted on the rear side of the trailers caravan, boat trailer or bicycle carrier, if so desired. For this purpose, the trailer, caravan, boat trailer or bicycle carrier can possibly be provided with a special mounting piece in the form of a kind of towing hook T. It goes without saying that the mounting piece is exclusively intended for mounting the apparatus on the trailer, caravan, boat trailer or bicycle carrier during the regular use of the towing hook and that this mounting piece has no further towing function.

Figure 3:
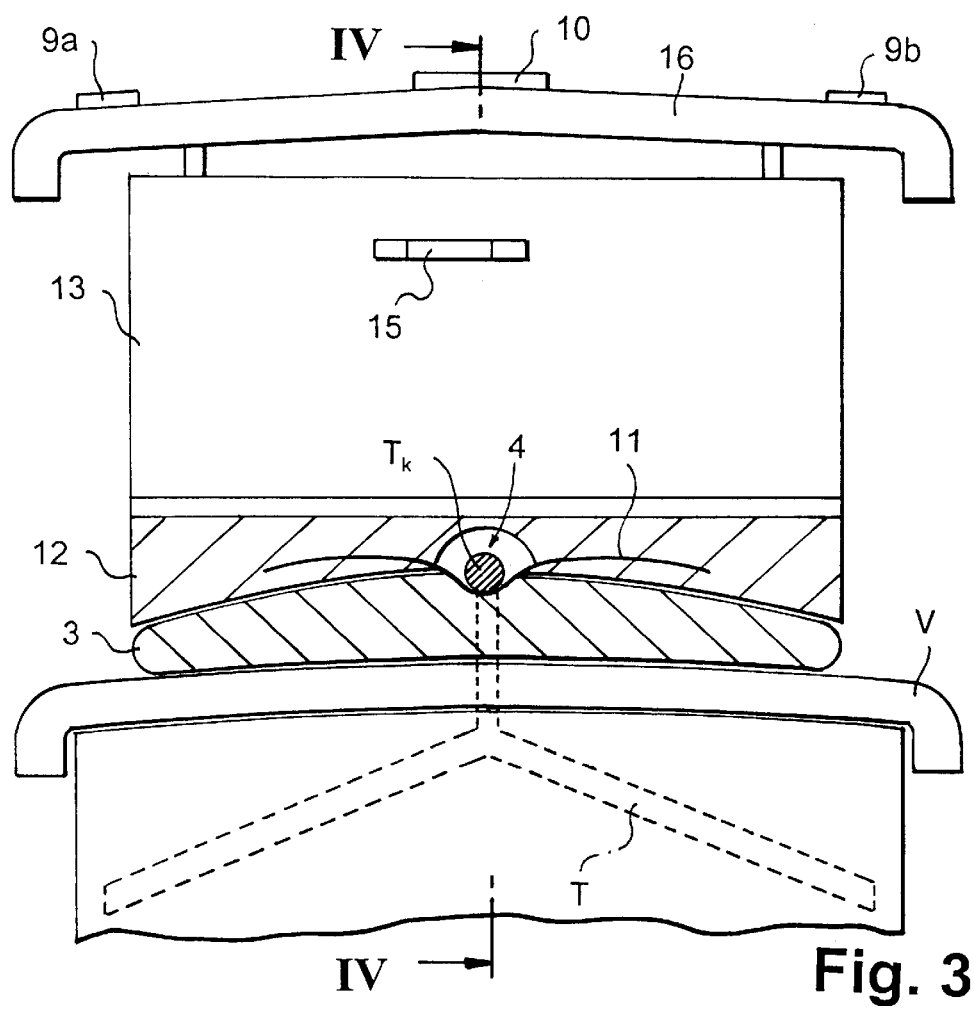
FIG. 3 is a sectional view of a second exemplary embodiment, taken on line III—III of FIG. 4.
Figure 4:
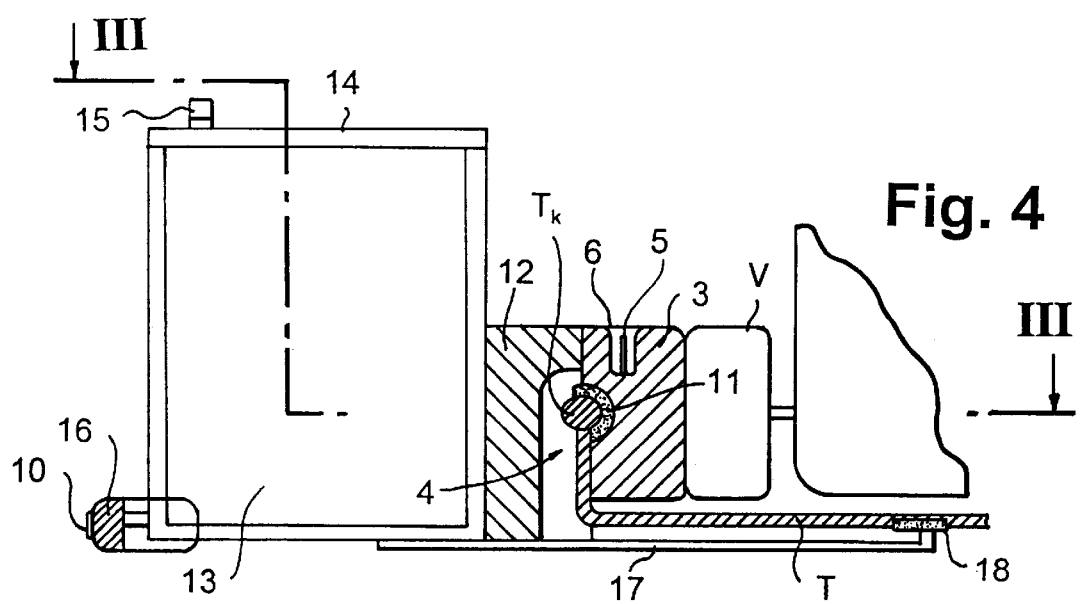
FIG. 4 is a sectional view of the second exemplary embodiment shown in FIG. 3, taken on line IV—IV of FIG. 3.

FIGS. 3 and 4 are sectional views of an exemplary embodiment in which the functional provision of the apparatus is designed as a housing 13 for storing objects therein. Via a connecting part 12, the housing is connected to the hook-catching element 11 which forms an integral part of the connecting part 12. Provided in the connecting part 12 is a free space 4 which prevents the forces occurring during collisions from being directly transmitted to the vehicle via the towing hook ball Tk and the associated towing hook construction. Due to this free space 4, the forces occurring during collisions are first transmitted, via the inflatable element 3, to the bumper v of the vehicle, allowing the crushable zones of the vehicle to be utilized in a normal manner. The housing 13 comprises a cover 14 which can be opened by means of a handgrip 15. Further, a bumper 16 is mounted on the housing 13. An anti-tilting support 17 has one end thereof fixedly connected to the bottom of the housing 13. The other end of the anti-tilting support is provided with a curved support plate 18 pressing against the bottom side of the tow bar T The anti-tilting support 17 prevents the housing 13 from tilting downwards around the towing hook ball Tk, under the influence of the load contained in the housing.

Figure 5:
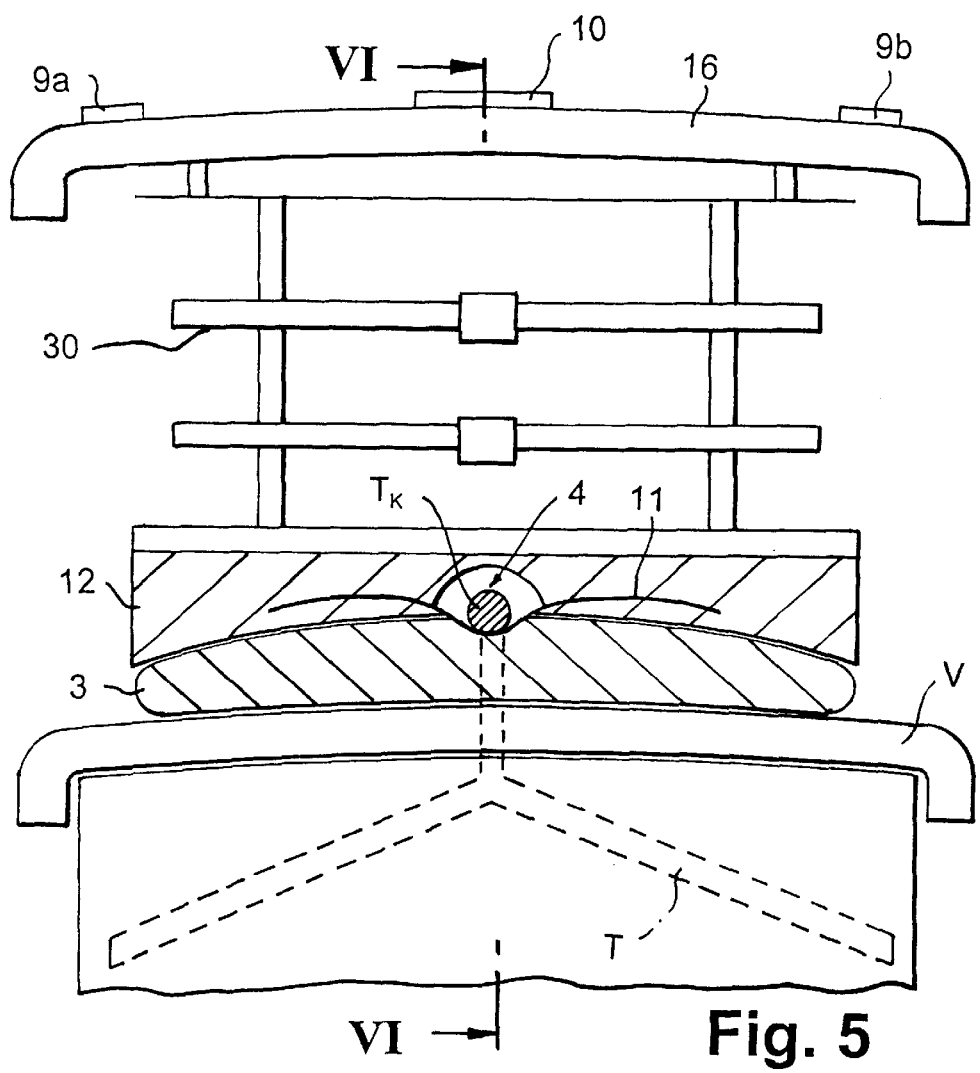
FIG. 5 is a sectional view of a third exemplary embodiment showing a bicycle carrier taken on line V—V of FIG. 6.
Figure 6:
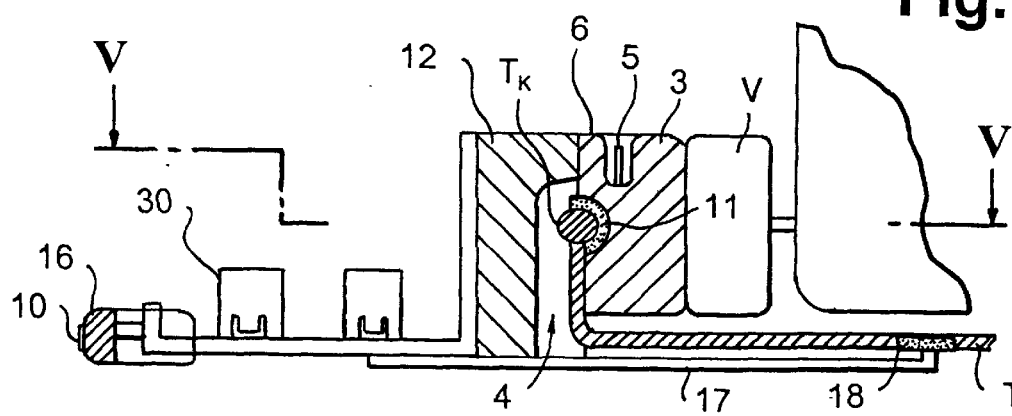
FIG. 6 is a sectional view of a third exemplary embodiment shown in FIG. 5, taken along line VI—VI of FIG. 5.

It is understood that in the same manner, a bicycle carrier can also readily be mounted on a hook attached to the rear side of the vehicle. The bicycle carrier (30) as used with the present invention is shown in FIGS. 5 and 6.

Although the above description of the exemplary embodiments in each case involved the mounting of the apparatus on a towing hook of a vehicle, the apparatus according to the invention is not limited thereto. It is also possible that on the rear side of the vehicle, one or more hooks are provided that are not intended for towing a caravan, boat trailer or trailer, but only serve for mounting thereon an apparatus according to the invention.

An important advantage of the apparatus is that the crushable zone of the vehicle, rendered inoperative through the presence of the towing hook construction, is operative again after the apparatus according to the invention has been mounted, due to the fact that forces occurring during collisions are transmitted to the rear side of the vehicle again and not, or to a much lesser extent, to the towing hook construction.

It is readily understood that the invention is not limited to the exemplary embodiments described and the variants, thereto described.

What is claimed is:

1. An apparatus for limiting injuries and damages occurring in the event of a collision, intended for mounting on at least one towing hook or towing hook construction (T) located adjacent a rear side (V) of a vehicle, characterized in that it is provided with at least one hook-catching element (11) which, in a mounted condition of the apparatus (1), is able to be located between the at least one hook (T) and the rear side (V) of the vehicle, and with an inflatable element (3) which, in a mounted condition of the apparatus (1), is located between the at least one hook-catching element (11) and the rear side (V) of the vehicle and is an inflated condition, causes the at least one hook-catching element (11) to be pressed against the at least one hook (T) and causing the inflatable element (3) to adapt itself, on the side thereof facing the vehicle, to the shape of the rear side (V) of the vehicle, the apparatus (1) comprising a functional provision (2, 13) connected to the at least one hook-catching element (11).

2. An apparatus according to claim 1, characterized in that the functional provision comprises a bumper (2).

3. An apparatus according to claim 1, characterized in that the functional provision comprises a bicycle carrier.

4. An apparatus according to claim 1, characterized in that the functional provision comprises a housing (13) for storing objects therein.

5. An apparatus according to claim 1, characterized in that the inflatable element (3) comprises an excess-pressure valve (S) by means of which the inflatable element (3) can be inflated and deflated.

6. An apparatus according to claim 5, characterized in that access to the valve can be prevented by a closable lock plate.

7. An apparatus according to claim 2, characterized in that the bumper (2) comprises at least one free space (4) at the location of the side of the hook (T) facing away from the vehicle, while on the side of the at least one free space (4) remote from the vehicle, a rigid plate material part (7) is provided.

8. An apparatus according to claim 1, characterized by an electric connector (8) and a complete set of vehicle rear lighting (9a, 9b), the connector (8) being connectable to a standard connector (C) provided on the hook designed as towing hook (T).

9. An apparatus according to claim 1, characterized by a license plate mounting position (10).

* * * * *

UNITED STATES PATENT AND TRADEMARK OFFICE
CERTIFICATE OF CORRECTION

PATENT NO.    : 6,224,119 B1
DATED         : May 1, 2001
INVENTOR(S)   : Alexander F.M. Haffmans It is certified that error appears in the above-identified patent and that said Letters Patent is hereby corrected as shown below:

Column 5,
Line 31, now reads "is an inflated" should read -- in an inflated --.

Signed and Sealed this

Eighth Day of January, 2002

Attest:

JAMES E. ROGAN
*Director of the United States Patent and Trademark Office*

*Attesting Officer*